(12) United States Patent
Varma et al.

(10) Patent No.: US 9,931,808 B1
(45) Date of Patent: Apr. 3, 2018

(54) CARRIER DEVICES HAVING SILICONE-FREE THERMOPLASTIC ELASTOMER (TPE) MATERIALS

(71) Applicant: Delphon Industries, LLC, Hayward, CA (US)

(72) Inventors: Rajesh Kumar Varma, San Ramon, CA (US); Darby Allen Davis, Fremont, CA (US); Claudia Leigh Allison, Hudson, WI (US)

(73) Assignee: Delphon Industries, LLC, Hayward, CA (US)

( * ) Notice: Subject to any disclaimer, the term of this patent is extended or adjusted under 35 U.S.C. 154(b) by 0 days.

(21) Appl. No.: 15/203,520

(22) Filed: Jul. 6, 2016

Related U.S. Application Data

(63) Continuation of application No. 14/216,580, filed on Mar. 17, 2014.

(60) Provisional application No. 61/801,558, filed on Mar. 15, 2013.

(51) Int. Cl.
*B32B 3/30* (2006.01)
*B32B 27/36* (2006.01)
*B32B 7/12* (2006.01)
*B32B 27/18* (2006.01)

(52) U.S. Cl.
CPC .................. *B32B 3/30* (2013.01); *B32B 7/12* (2013.01); *B32B 27/18* (2013.01); *B32B 27/36* (2013.01); *B32B 2307/744* (2013.01); *B32B 2405/00* (2013.01)

(58) Field of Classification Search
CPC .. B32B 3/30; B32B 27/36; B32B 7/12; B32B 27/18; B32B 2307/744; B32B 2405/00
See application file for complete search history.

(56) References Cited

U.S. PATENT DOCUMENTS

| 2,744,624 | A | 5/1956 | Hoogstoel et al. |
| 4,778,326 | A | 10/1988 | Althouse et al. |
| 4,966,281 | A | 10/1990 | Kawanishi et al. |
| 5,089,314 | A | 2/1992 | Masujima et al. |
| 5,318,926 | A | 6/1994 | Dlugokecki |
| 5,335,477 | A | 8/1994 | Weder |
| 5,591,290 | A | 1/1997 | Walter et al. |
| 5,648,136 | A | 7/1997 | Bird |
| 5,682,731 | A | 11/1997 | Althouse |
| 5,700,697 | A | 12/1997 | Dlugokecki |
| 5,769,237 | A | 6/1998 | Althouse et al. |
| 5,908,114 | A | 6/1999 | Althouse et al. |

(Continued)

FOREIGN PATENT DOCUMENTS

| CA | 2 621 102 C | 6/2013 |
| EP | 1 475 490 B1 | 4/2008 |

(Continued)

OTHER PUBLICATIONS

Office Action in U.S. Appl. No. 14/216,580 dated Sep. 21, 2016.

(Continued)

*Primary Examiner* — Michael C Miggins
(74) *Attorney, Agent, or Firm* — Nixon Peabody LLP

(57) ABSTRACT

The invention relates generally to carrier materials. More specifically, the present invention relates to silicon-free thermoplastic elastomer (TPE) materials for use in carrier devices. In some embodiments, a textured film to temporarily immobilize a device is provided, characterized in that a surface of the film in contact with the one or more objects is comprised of textured topology.

25 Claims, 4 Drawing Sheets

(56) References Cited

U.S. PATENT DOCUMENTS

| | | |
|---|---|---|
| 6,029,427 A | 2/2000 | Freund et al. |
| 6,495,379 B2 | 12/2002 | Lketani |
| 6,528,330 B2 | 3/2003 | Lketani |
| 6,544,371 B2 | 4/2003 | Senoo et al. |
| 6,640,864 B2 | 11/2003 | Downs |
| 6,813,828 B2 | 11/2004 | Dlugokecki et al. |
| 6,884,663 B2 | 4/2005 | Dlugokecki et al. |
| 7,081,933 B2 | 7/2006 | Yu et al. |
| 7,780,005 B2 | 8/2010 | Allison et al. |
| 8,513,347 B2 | 8/2013 | Tse et al. |
| 8,652,640 B2 | 2/2014 | Santore et al. |
| 2003/0049437 A1 | 3/2003 | Devaney et al. |
| 2011/0005667 A1 | 1/2011 | Allison et al. |

FOREIGN PATENT DOCUMENTS

| | | |
|---|---|---|
| WO | WO 92/09418 A1 | 6/1992 |
| WO | WO 2005/026434 A1 | 3/2005 |
| WO | WO 2011/038276 A2 | 3/2011 |

OTHER PUBLICATIONS

Office Action in U.S. Appl. No. 14/216,580, dated Jan. 19, 2017.
Office Action in U.S. Appl. No. 14/216,580, dated May 18, 2017.
Office Action in U.S. Appl. No. 14/216,580, dated Dec. 1, 2017.

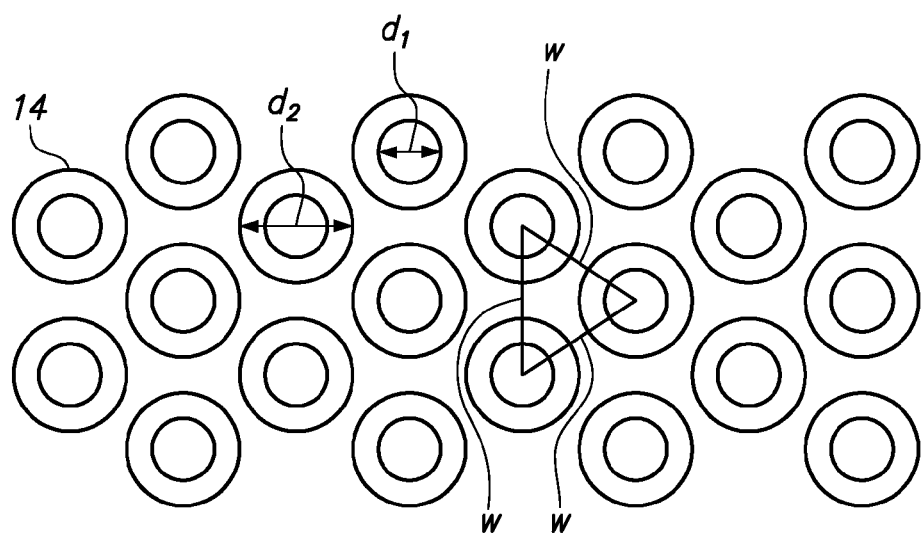
FIG. 3
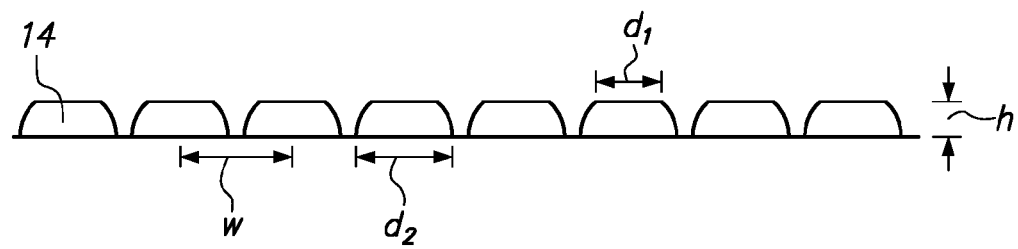
FIG. 4
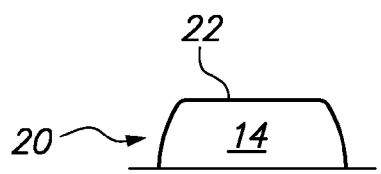    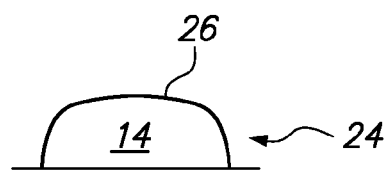
FIG. 5A          FIG. 5B

CARRIER DEVICES HAVING SILICONE-FREE THERMOPLASTIC ELASTOMER (TPE) MATERIALS

RELATED APPLICATIONS

This is a continuation of U.S. patent application Ser. No. 14/216,580, filed on Mar. 17, 2014, which claims the benefit of, and priority to, U.S. Provisional Patent Application Ser. No. 61/801,558, filed on Mar. 15, 2013, entitled "Silicone-Free Thermoplastic Elastomer (TPE) Materials For Use In Carrier Devices", which is hereby incorporated by reference in its entirety.

TECHNICAL FIELD

The present invention relates generally to carrier materials. More specifically, the present invention relates to silicon-free thermoplastic elastomer (TPE) materials for use in carrier devices.

BACKGROUND OF THE INVENTION

Silicone-based carrier devices currently used in the electronic, medical and photonics industries are silicon-based. Under unique circumstances, silicone in the carriers may produce chemical interactions that can lead to difficulty in removing the electronic and photonic devices from the carriers. Further, silicone can act as a lubricant and transference of silicone may occur which can cause problems with downstream processing of the devices.

Such industries continue to seek improved carrier devices, particularly for transport of fragile objects or components. As component sizes continue to shrink, providing carrier devices that securely immobilize delicate objects without damage, while also preventing contamination of such objects, has become difficult. Moreover, industries continue to automate the manufacture of components and the use of pick and place machines has become widespread.

Pick and place machines require precision. Components placed in a carrier device must be located and precise locations and the carrier device design must secure the components such that they do not move during transport, and yet, the components must not adhere too securely otherwise the components are not easily removed. Fragile or small components can be difficult to remove as they are easily damaged. The amount of force necessary to remove such components can be small, and this must be balanced by the adhesive forces necessary to securely immobilize the components. Thus, improved carrier device designs are currently needed.

SUMMARY OF THE INVENTION

The present invention overcomes the foregoing shortcomings in the art by providing a method comprising the steps of: (a) preparing a composition comprising a thermoplastic elastomer (TPE); and (b) applying the composition to a carrier device for fragile parts, devices, components, materials and/or items.

The TPE composition may comprise a partially or fully hydrogenated mono(lower)olefin block copolymer, comprising: (a) a vinylaromatic compound; and (b) a conjugated diene.

In one embodiment, the block copolymer may comprise vinylaromatic end-blocks and a mid-block selected from the group consisting of polyisoprene, polybutadiene, and hydrogenated copolymers.

In another embodiment, the block copolymer is selected from the group consisting of diblock, triblock, tetrablock, or star copolymers.

In a further embodiment, the block copolymer is selected from the group consisting of styrene-ethylene-butylene-styrene (SEBS), styrene-ethylene-propylene-styrene (SEPS), styrene-ethylene-ethylene-butylene-styrene (SEEBS), styrene-butadiene-styrene (SBS), styrene-isoprene-styrene (SIS), styrene-isobutylene-styrene (SIBS), and poly(methyl methyacrylate)-b-poly(n-butyl acrylate)-b-poly(methyl methacrylate) (PMMA-b-PnBA-b-PMMA).

In another embodiment, the TPE composition further comprises one or more additives selected from the group consisting of polyolefins, plasticizers, other elastomers, fluorescent dyes, and antioxidants.

In a further embodiment, the polyolefins are selected from the group consisting of polypropylene, polyethylene, and copolymers thereof.

In another embodiment, the TPE composition comprises TPE in the range of 25-100%, one or more polyolefins in the range of 0-25%, and one or more plasticizers in the range of 0-60%.

In other embodiments, the TPE composition is texturized or is a film with selective tack.

In further embodiments, the TPE film is layered, wherein the layering allows for the selective tack and bulk modulus of the film to be separately controlled.

In still another embodiment, the fragile parts, devices, components, materials and/or items are selected from the group consisting of electronic components, photonic components, opto-electronics, optronics, medical devices and components, and jewelry. Examples of electronic components that may be used with the present invention include semiconductor integrated circuits, silicon wafers, and disk drive sliders. Examples of photonics components that may be used with the present invention include optical devices and crystal structures.

In still a further embodiment, the carrier device is a transportation carrier or an in process carrier. Examples of transportation carriers that may be used with the present invention include a Gel Box or a Vacuum Release (VR) tray, or carriers of other designs. The present invention may be used in an in process carrier for a tape and reel device or for disk drive lapping.

In another aspect of the invention, use of a textured film for temporarily immobilizing one or more objects is provided.

In a further aspect, embodiments of the present invention include a textured film for temporarily immobilizing one or more objects characterized in that a surface of the film in contact with the one or more objects is comprised of textured topology. The textured surface of the film immobilizes the object. The topology of the textured film may be configured to provide selective contact area with the one or more objects.

In an even further aspect, embodiments of the present invention include a carrier device for temporarily immobilizing one or more objects comprising a substrate and a textured film on the substrate, wherein the one or more objects are temporarily immobilized by contact with the textured film.

Additional aspects and embodiments of the invention will be provided, without limitation, in the detailed description of the invention that is set forth below.

BRIEF DESCRIPTION OF THE DRAWINGS

Other objects and advantages of embodiments of the present invention will become apparent upon reading the detailed description of the invention and the appended claims provided below, and upon reference to the drawings, in which:

FIG. 3 is a top plan view schematically illustrating a textured film according to one embodiment of the present invention;

FIG. 4 is a side view schematically illustrating the textured film of FIG. 3;

FIGS. 5A and 5B are exploded side views of a top surface of a textured film according to two different embodiments of the present invention.

DETAILED DESCRIPTION OF THE INVENTION

Figure 1:
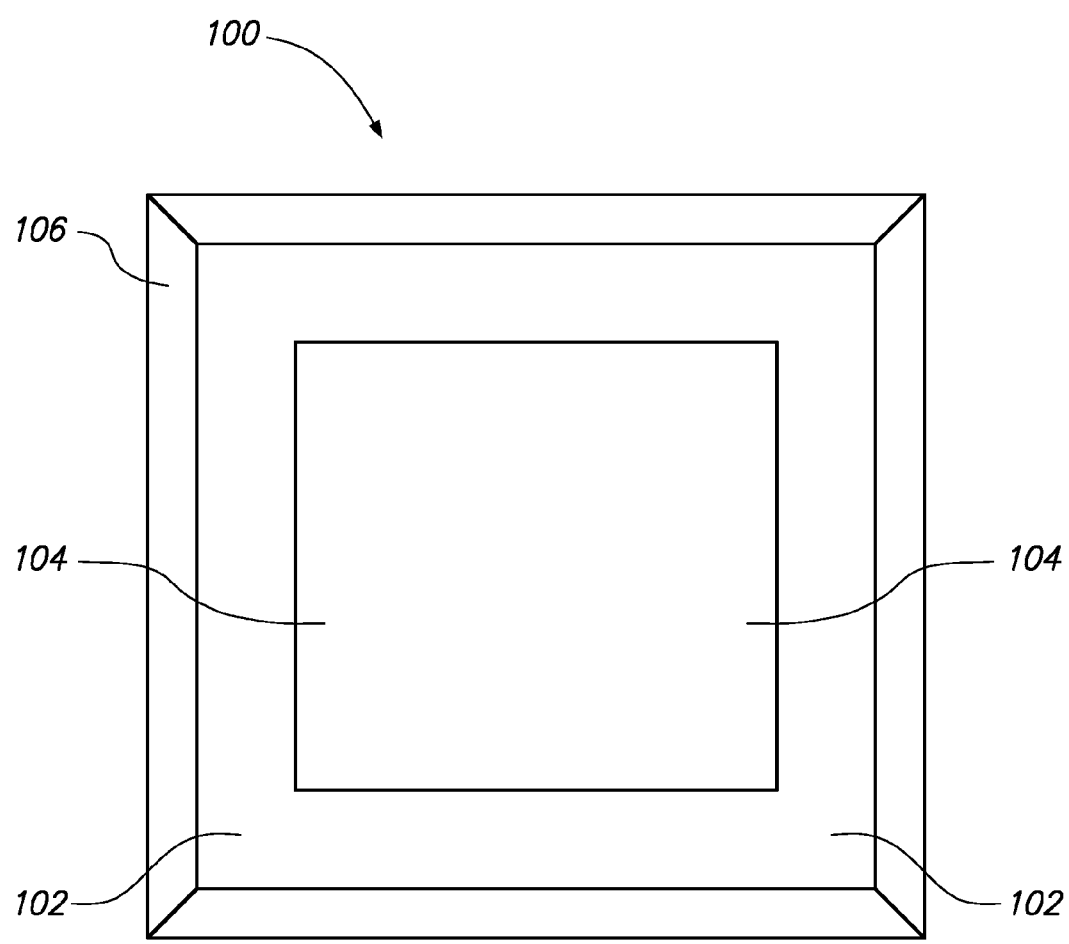
FIG. 1 illustrates one example of a carrier device comprising a tray and a TPE film on which objects may be temporarily immobilized.

Set forth below is a description of what are currently believed to be preferred embodiments of the claimed invention. Any alternates or modifications in function, purpose, or structure are intended to be covered by the claims of this application. As used in this specification and the appended claims, the singular forms "a," "an," and "the" include plural referents unless the context clearly dictates otherwise. The terms "comprises" and/or "comprising," as used in this specification and the appended claims, specify the presence of stated features, integers, steps, operations, elements, and/or components, but do not preclude the presence or addition of one or more other features, integers, steps, operations, elements, components, and/or groups thereof.

As used herein, the term "silicone-free" means that the subject material and/or composition is free of any silicone content and that no silicone was used in the formulation of the material and/or composition.

As used herein, the term "carrier device" is meant to include both transportation carrier devices and in-process carrier devices. As will be understood by those of skill in the art, transportation carriers are used for the physical movement of parts while in-process carriers are used to handle and/or store parts during manufacturing processes.

The present invention provides a 100% silicone-free thermoplastic elastomer (TPE) composition comprising a partially or fully hydrogenated mono(lower)olefin block copolymer comprising (a) a vinylaromatic compound; and (b) a conjugated diene. In a further embodiment, the block copolymer comprises vinylaromatic end-blocks and a midblock selected from the group consisting of polyisoprene, polybutadiene, and hydrogenated copolymers.

Examples of block copolymers that may be used to prepare the TPE compositions described herein include without limitation, styrene-ethylene-butylene-styrene (SEBS), styrene-ethylene-propylene-styrene (SEPS), styrene-ethylene-ethylene-butylene-styrene (SEEBS), styrene-butadiene-styrene (SBS), styrene-isoprene-styrene (SIS), styrene-isobutyelene-styrene (SIBS), and poly(methyl methyacrylate)-b-poly(n-butyl acrylate)-b-poly(methyl methacrylate) (PMMA-b-PnBA-b-PMMA).

The TPE compositions described herein may comprise one or more additives selected from the group consisting of polyolefins, plasticizers, polystryenes, other elastomers, fluorescent dyes, and antioxidants. Polyolefins that may be used with the TPEs include, without limitation, polypropylene, polyethylene, and copolymers thereof.

In one embodiment, the TPE composition of the present invention comprises TPE in the range of 25-100%, one or more polyolefins in the range of 0-25%, and one or more plasticizers in the range of 0-60%.

The silicone-free thermally formed TPE compositions described herein have low surface energy and no silicone residue, which makes the compositions useful for carriers of parts, devices, components, materials, and/or items, where the latter experience chemical interactions with silicone. The silicone-free TPE compositions of the present invention thus overcome the problem of the unwanted bonding and transference of silicone that occurs between some parts, devices, components, materials, and/or items and silicone-based carriers. As will be appreciated by those of skill in the art, the parts, devices, components, materials, and/or items remain stable within the carriers due to the surface tack of the TPE compositions.

The TPE composition of the present invention may be used in the manufacture of both transportation carrier and in-process carriers. Transportation carriers manufactured with the TPE compositions of the present invention will typically, but not necessarily, be carriers used for the movement of fragile parts, devices, components, materials, and/or items. Examples of fragile parts, devices, components, materials, and/or items for use with the TPE-based transportation carriers of the present invention will include without limitation, electronic components, such as semiconductor integrated circuits, silicon wafers, and disk drive sliders; photonics components, such as optical devices and crystal structures; and consumer products, such as jewelry. Examples of in-process carriers include without limitation carriers used in tape and reel applications and carriers used in disk drive lapping.

The TPE-based transportation carriers of the present invention facilitate the shipping and handling of fragile parts, devices, components, materials, and/or items that cannot be shipped by other means without damage to the fragile parts, devices, components, materials, and/or items. In addition, the TPE-based transportation and in-process carriers both have the ability to maintain the orientation of the fragile parts, devices, components, materials, and/or items within the carriers. For the TPE-based in-process carriers, this allows for ease of use of the carriers in manufacturing processes. Where the TPE-based carriers are used for consumer purposes, such as for the shipping and handling of fine jewelry, the carriers have the capacity to enhance the visual presentation of the contents by maintaining the contents in a set position within the carrier throughout the transportation and handling period.

The thermoplastic nature of TPE allows the silicone-free TPE compositions of the present invention to be moldable using heat; an advantage that is not found with thermoset silicone-based materials currently used. In this regard, carriers prepared with the silicone-free TPE compositions of the present invention are easier to manufacture than comparable carriers prepared with silicone-based materials. The moldable nature of the silicone-free TPE compositions of the present invention allow the devices described herein to be manufactured with greater ease over comparable devices prepared with silicone-based materials.

In one embodiment, the TPE compositions of the present invention can be prepared as films that may be used to line a carrier device. In another embodiment, the TPE compositions can be texturized to exhibit a particular pattern. In a further embodiment, the TPE compositions can be prepared to exhibit selective tack, wherein the composition exhibits enhanced and/or decreased tack in specified areas of the carrier as required for the particular device to be carried and/or transported. When in film form, the TPE compositions may be prepared in a layered manner, such that surface tack and bulk modulus of the compositions can be independently controlled.

In another aspect of the invention, use of a textured film for temporarily immobilizing one or more objects is provided. A textured film for temporarily immobilizing one or more objects is also provided characterized in that a surface of the film in contact with the one or more objects is selectively textured. In a further aspect, embodiments of the present invention include a carrier device for temporarily immobilizing one or more objects comprising a substrate and a textured film on the substrate, wherein the one or more objects are temporarily immobilized by contact with the textured film.

In some embodiments, the surface of the film in contact with the object(s) is textured and has a topology configured to provide selective contact area with the object(s). In some embodiments, the textured topology on the surface of the film is configured to provide regions of selective tack across the surface of the film.

The textured film may be used to immobile objects in a variety of forms. For example, the textured film may be used alone, or as a roll of film. Optionally, the textured film may be formed atop a substrate. Additionally, the textured film may be used in a device. In some embodiments the textured film may be used to line a carrier device. Any suitable carrier device may be used, such as but not limited: to a Gel Box or a Vacuum Release (VR) tray, such as those described in U.S. Pat. Nos. 5,769,237, 5,908,114 and 7,780,005 the entire disclosures of which are incorporated by reference herein, among other carrier device designs.

Referring to FIG. 1, one example of a textured film in a carrier device is shown. Specifically, the carrier device 100 is generally comprised of a substrate 102 and a textured film 104 on the substrate. The substrate 102 with textured film 104 thereon may be used in any type of carrier design. In one exemplary embodiment the substrate 102 and textured film 104 are placed on a tray 106. In another exemplary embodiment (not shown) the substrate 102 and textured film 104 are placed in a box.

In another embodiment, a carrier device for temporarily immobilizing one or more objects is provided where no substrate is used. In this embodiment, the textured film has a top surface and a back surface. A polyester backing is formed on the back surface of the textured film, and a layer of pressure sensitive adhesive (PSA) formed on a back side of the polyester backing to form a stack of film/polyester/PSA. This embodiment may be particularly useful in subsequent lapping applications.

Figure 2A:
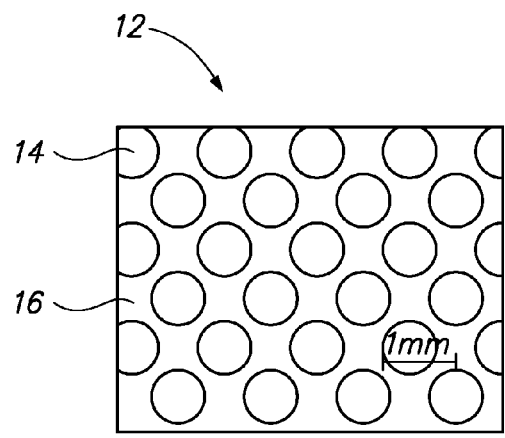
FIGS. 2A-2C are photographs showing top plan views of textured films according to three embodiments of the present invention.
Figure 2B:
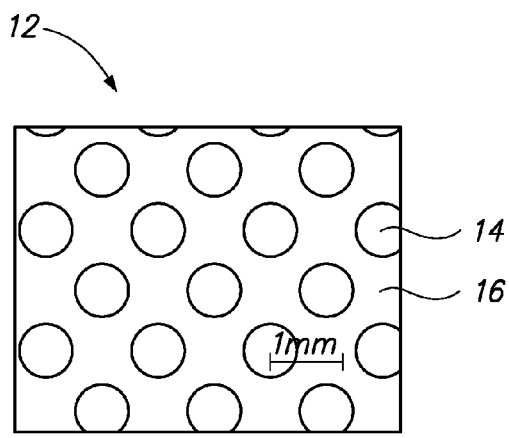
Figure 2C:
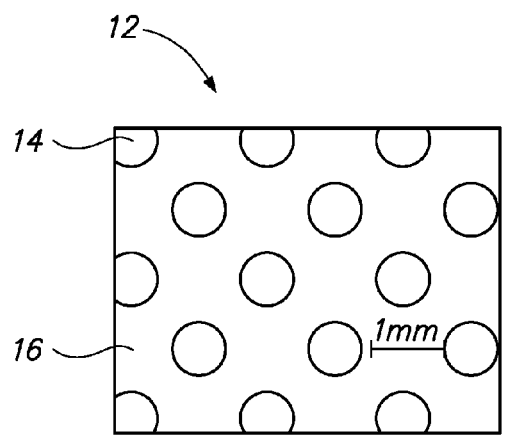

Generally, the textured film comprises textured topology on the surface of the film in contact with the one or more objects. In some embodiments the textured topology is comprised of a plurality of projections formed across the surface of the film, each projection being spaced apart from an adjacent projection. Referring to FIGS. 2A-2C a textured film 12 is shown having a plurality of projections 14 formed on a surface 16 of the film. The projections may be formed across the surface of the film in any desired pattern. For example, the projections may be evenly distributed on the surface. Alternatively, the projections may be randomly or variably distributed on the surface. In some embodiments, the surface of the film may comprise multiple regions, with different distribution of the projections in one, more, or all of the regions.

Of particular advantage, the texture topology of the film may be selectively configured in a variety of ways in order to manipulate the holding force of objects immobilized on the film. This provides significant flexibility and allows the film to be adapted for use in a variety of applications and products. The textured film is generally manipulated by varying the topography of the surface of the film. For example, the topology on the surface of the film may vary in density. Variation in the density is generally, but not necessarily, achieved by varying the number and/or spacing of projections distributed across the surface of the film. Referring again to FIGS. 2A-2C, three exemplary embodiments are shown. FIG. 2A illustrates a high density of projections 14 that are closely spaced. This configuration is best suited for temporarily immobilizing small objects, such as smaller sized die. FIG. 2B illustrates a moderate density of projections 14, and FIG. 2C illustrates a relatively small density of projections.

One embodiment of an exemplary textured film is shown in more detail with reference to FIG. 3 and FIG. 4. Schematic diagrams are shown in FIG. 3 and FIG. 4 of a top plan view, and a corresponding side view, respectively, illustrating a textured film according to one embodiment of the present invention. In the exemplary embodiment as shown, the textured topology of the surface 16 of the film 12 is comprised of a plurality of projections 14, where each projection 14 has at least a: height h, a top or distal diameter $d_1$, a bottom or proximal diameter $d_2$, and spacing w between adjacent projections. The spacing w is defined as the centerline-to-centerline spacing between adjacent projections. The dimensions of the projections 14 may be selectively configured to modify the surface properties of the textured film. For example, the dimensions of the projections 14 may be modified to provide the textured film with selective tack. The dimensions of the projections 14 may be modified to vary the percentage of contact area of an object placed on the textured film.

For example, and without limitation, the top diameter $d_1$ is in the range of about 2.0 mm to 0.05 mm, and more usually in the range of 0.75 mm to 0.25 mm. In one example, the top diameter $d_1$ is 0.55 mm. The bottom diameter $d_2$ may be equal to or greater than the top diameter $d_1$. In some embodiments, the bottom diameter $d_2$ is in the range of about 2.0 mm to 0.05 mm, and more usually in the range of 1.0 mm to 0.8 mm. In one example, the bottom diameter $d_2$ is 0.70 mm. In another embodiment, $d_1$ is 0.20 mm and $d_2$ is 0.55 mm. In some embodiments, the centerline-to-centerline spacing w between projections is in the range of about 0.4 mm to 2.5 mm, and more usually in the range of 0.5 mm to 1.5 mm. In one example, the spacing w is 1.0 mm. In some embodiments, the height of the projections is in the range of about 20 um to 200 um, and more usually in the range of 50 um to 150 um. In one example the height h is 100 um. While specific examples and values are shown, those of ordinary skill in the art will understand that many other arrangements and/or values are possible based on the teaching and description provided herein.

As described above, the textured surface of the film may be adapted to provide selective tack, or to tune the local tack in a particular region. In some embodiments, the textured film comprises at least a first region of selective tack $t_i$ and a second region of selective tack $t_2$, and where the first region of selective tack $t_i$ has projections with spacing $w_1$ and the second region of selective tack $t_2$ has projections with spacing $w_2$. In some embodiments, local tack is adjusted up to 3× by changing the spacing w.

Control of tack of the textured film globally, or local tack in selection regions such as first and second regions of selective tack $t_1$ and $t_2$, may be achieved by varying contact area of the textured surface topology. Manipulating or selectively controlling the contact area of the textured film may be achieved in a variety of ways. Contact area is defined as the percent (%) of contact of an object on the surface of the textured film. In some embodiments, the contact area is manipulated or selectively controlled by varying the top diameter $d_1$ of the projections across the film, or in each of the regions when addressing local tack. The ratio of the top to bottom diameters $d_1$, $d_2$ may also be varied. Contact area may also be manipulated or selectively controlled by varying the shape of the top or distal end of the projections. In some embodiments, texture of the surface of the film is changed to create total top contact area variation of between 4% to 40%.

Shape of the top or distal end of the projections may take a variety of forms and may be changed to selectively vary the contact area. Two examples are shown with reference to FIGS. 5A and 5B. FIG. 5A illustrates a projection 14 having a top end 20 with a flat surface 22. FIG. 5B illustrates a projection 14 having a top end 24 with a curved surface 26. The curved surface may be hemispherical, partially hemispherical, dome shaped or cylindrical. The curvature of the curved surface 26 is equal to or less than 180 degrees. In some embodiments the radius of curvature of the curved surface 26 is in the range of 0.5 mm to 6.0 mm.

The projections can be of any geometry. While a circular geometry is shown in the figures, other geometries are within the spirit and scope of the invention. For example, in some embodiments projections 12 may have a diamond shape. In some embodiments, projections 12 may have a cube, star, hexagonal or octagonal shape, and the like. In some embodiments, a mix of shapes may be used.

The inventors have discovered a correlation between texture, the contact area, and the resulting average pick force necessary to remove an object temporarily immobilized on the surface of the textured film. Specifically, Table 1 below illustrates the relationship between the degree of texture or textured topology of the surface of the film and the contact area percentage with respect to an object placed on the textured surface. Further, the average pick force for removing the object from the textured surface for the varying degree of texture is established and shown in Table 1.

TABLE 1

| Texture top dia, mm | Contact Area, % | Avg. Pick Force, gf |
|---|---|---|
| No Texture | 100.0% | 542 |
| 0.7 | 38.5% | 45.6 |
| 0.55 | 23.8% | 32.1 |
| 0.45 | 15.9% | 24.7 |
| 0.35 | 9.6% | 10 |
| 0.25 | 4.9% | 7.9 |

Thus of significant advantage, according to embodiments of the present invention the degree of texture of a surface may be selected, tuned and/or controlled in order to selectively secure and immobilize objects.

The textured film may be formed of any suitable material. Generally, the textured film is comprised of an adhesive material. Preferably, the textured film is comprised of a silicone free thermoplastic elastomer (TPE) composition as described in detail herein. In other embodiments, the textured film is comprised of a silicone composition.

Figure 6:
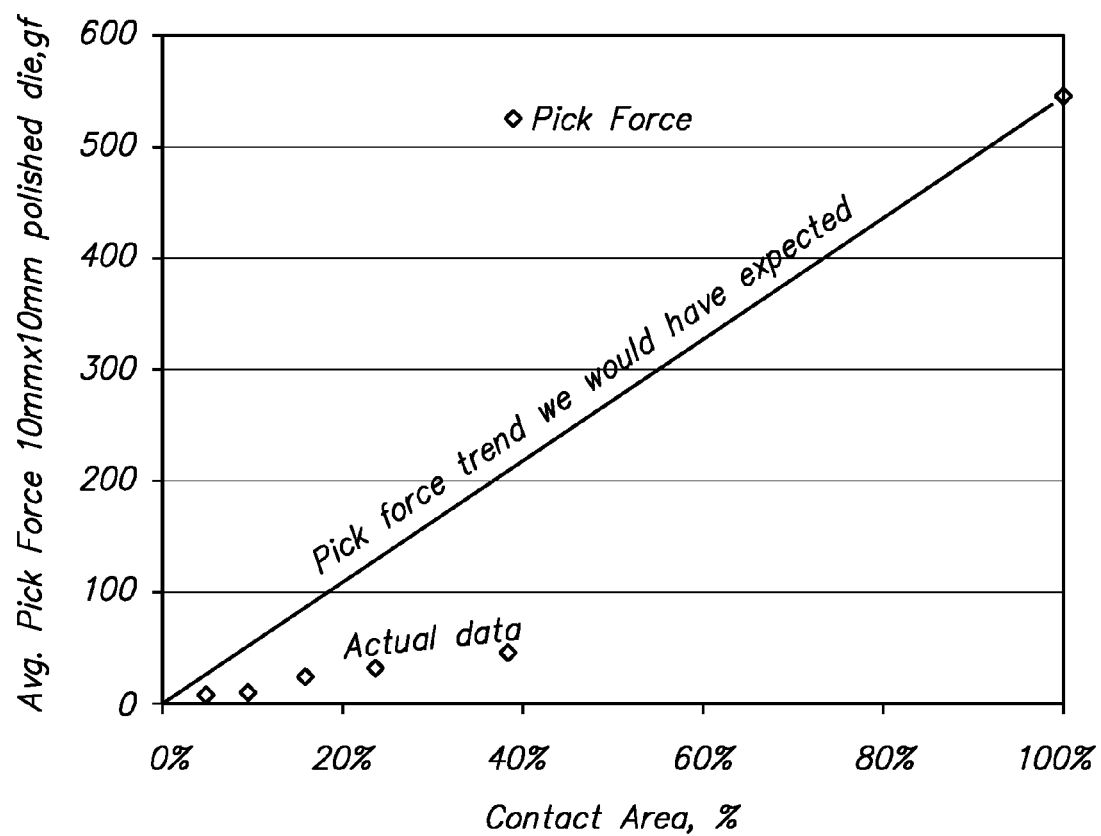
FIG. 6 is a graph illustrating an unexpected actual correlation of average pick force to contact area of textured films according to some embodiments of the present invention, and as compared to the expected correlation.

As discussed above, some embodiments of the present invention provide a textured film that imparts selective tack across a surface of the film. Tack is generally considered to be a property of an adhesive material that allows the material to adhere to another surface on immediate contact. Tack is sometimes thought of simply as the resistance to separation. In the context of the present invention, tack or tackiness is considered in the context of the average pick force (gf) required to remove or separate the object from the surface of the film. The average pick force required to remove an object may also be dependent upon the type of film material, and further may be temperature and pressure sensitive based upon viscoelastic deformation of the film material. FIG. 6 is a graph illustrating actual data of average pick force (gf) as a function of contact area %. Also shown on the graph is a comparison of this actual data as compared to the trend of the average pick force that the inventors expected to see. Specifically, a 10 mm by 10 mm polished die was immobilized on different textured films according to embodiments of the present invention, the textured films having texture topology that imparted contact area (measured as a % of the die in contact with the surface of the textured film) between about 4% to 40%. As shown, the actual pick force required to remove the die is much lower than the expected average pick force based on what the inventors expected would be the outcome. Referring again to Table 1 above and FIG. 6, it is shown that for a textured film providing 38.5% contact area, an average pick force of 45.6 gf was required to remove a device from this textured film. This pick force is much smaller than what the inventors expected. It was expected that the relationship between contact area and pick force would be substantially linear, Thus, given an average pick force of 542 gf for a film with 100% contact area (i.e. no texture) it would be expected that a 38.5% contact area would require a pick force of approximately 208 gf (i.e. 38.5 percent of 542). However, only 45.6 gf was actually required according to the invention. As such, the actual relationship between contact area and pick force is non-linear. This result is a surprise and was not predicted. Accordingly, the invention provides unexpected results. Such a small pick force is very beneficial, particularly when handling very small die or devices which are easily damaged.

The textured film as described above according to embodiments of the present invention may be manufactured using and suitable method. In one example, the textured film is made using extrusion coating or cast extrusion line techniques. Such extrusion techniques are known in the art. For example, extrusion coating generally involves extruding resin from a slot die at elevated temperatures directly onto moving web. The resin may then be passed through a nip having a rubber covered pressure roller and a chrome plated cooling roll. The cooling roll cools the molten film back into the solid state. The cooling roll also contains a textured pattern that imparts the selected textured topology and finish to the surface of the film.

In another embodiment, a textured film according to some embodiments of the present invention is manufactured by a foaming extrusion coating process. In this embodiment, a foaming agent is added to the extruding resin composition, and the resin composition and foaming agent are co-extruded onto the moving web. This process creates an irregular or random pattern on the surface of the film.

Any suitable foaming agent or additive may be used. In some embodiments, the foaming agent is citric acid or sodium bicarbonate.

In some embodiments, it may be desired to add one or more additives to the textured film to impart certain additional properties to the film. The textured film may optionally be configured to minimize harmful buildup of electrostatic change in the objects being carried on the surface the textured film. In one embodiment, the textured film is configured to have electrostatic discharge protection properties. For example, one or more additives may be added to the textured film to impart antistatic or conductive properties to the film. Any suitable additive may be used. For example, and without limitation, additives to provide electrostatic discharge protection may be selected from any one or more of: carbon nano tubes (CNT); carbon based powders such as carbon black or carbon fiber; conductive polymers or conductive based powders or fibers; or antistatic additives such as modified urethane (Stat-Rite™), and the like. In some embodiments, the textured film of the present invention exhibits surface resistance to E6-E9, which is static dissipative.

Additionally, the textured film may optionally be configured to exhibit chemical resistance, such that the film is less vulnerable to degradation from solvents and other chemicals. In some embodiments, one or more additives are added to the textured film to improve the chemical resistance properties of the film. Any suitable additive may be used. For example, and without limitation, additives to provide chemical resistance protection may be selected from any one or more of: Fluor elastomers, polyphenylene oxide, and the like.

The silicone-free TPE compositions of the present invention may be used in form factors that are not possible with silicone-based material. For example, TPE films may be substituted for the adhesive tape used in tape and reel applications. In all applications, the TPE compositions described herein may have surfaces that are smooth, texturized, or patterned. As discussed above, the TPE compositions may also be prepared to have selective tack. Other applications of the TPE compositions described herein will be evident to one of ordinary skill in the art.

It is to be understood that while the invention has been described in conjunction with the embodiments set forth above, the foregoing description is intended to illustrate and not limit the scope of the invention. Further, it is to be understood that the embodiments set forth herein are not exhaustive and that modifications and variations of the invention will be apparent to those of ordinary skill in the art without departing from the scope and spirit of the invention.

What is claimed is:

1. A textured film for temporarily immobilizing one or more objects, characterized in that: the textured film is comprised of a silicone free thermoplastic elastomer (TPE), and a surface of the film in contact with the one or more objects is comprised of textured topology, wherein the textured topology on the surface of the film is selectively textured across the surface of the film to provide regions of selective tack across the surface of the film.

2. The textured film of claim 1, wherein the textured topology is irregular.

3. The textured film of claim 1 wherein the textured topology is comprised of a plurality of spaced apart projections, each projection having a height h, a top diameter $d_1$, a bottom diameter $d_2$, and spacing w between adjacent projections.

4. The textured film of claim 1, wherein the textured topology is comprised of a plurality of projections formed across the surface of the film.

5. The textured film of claim 4 wherein the plurality of projections are randomly or variably distributed across the surface of the film.

6. The textured film of claim 4 wherein each of the projections has a distal end, and the distal end is substantially flat or curved.

7. The textured film of claim 6 wherein the distal end is curved and has a curvature equal to or less than 180 degrees.

8. The textured film of claim 6 wherein the distal end is any one of: hemispherical, partially hemispherical, dome shaped, or cylindrical.

9. The textured film of claim 1 wherein the textured topology is configured to provide variable contact area with the one or more objects in contact with the surface.

10. The textured film of claim 9 wherein the contact area is the percent of contact area of an object in contact with the surface of the film.

11. The textured film of claim 10 wherein the contact area is in the range of 4 to 40%.

12. The textured film of claim 1 wherein the textured topology is configured to provide regions of selective tack.

13. The textured film of claim 12 further comprising: at least a first region of selective tack $t_1$ and a second region of selective tack $t_2$, and where the first region of selective tack $t_1$ has projections with spacing $w_1$ and the second region of selective tack $t_2$ has projections with spacing $w_2$.

14. The textured film of claim 12 wherein the tack is adjusted up to 3 times with a change in spacing w.

15. The textured film of claim 1 wherein the TPE composition comprises a partially or fully hydrogenated mono (lower)olefin block copolymer, comprising,
   (a) a vinylaromatic compound; and
   (b) a conjugated diene.

16. The textured film of claim 15 wherein the block copolymer comprises vinylaromatic end-blocks and a mid-block selected from the group consisting of polyisoprene, polybutadiene, and hydrogenated copolymers.

17. The textured film of claim 15 wherein the block copolymer is selected from the group consisting of diblock, triblock, tetrablock, or star copolymers.

18. The textured film of claim 15 wherein the block copolymer is selected from the group consisting of styrene-ethylene-butylene-styrene (SEBS), styrene-ethylene-propylene-styrene (SEPS), styrene-ethylene-ethylene-butylene-styrene (SEEBS), styrene-butadiene-styrene (SBS), styrene-isoprene-styrene (SIS), styrene-isobutylene-styrene (SIBS), and poly(methyl methyacrylate)-b-poly(n-butyl acrylate)-b-poly(methyl methacrylate (PMMA-b-PnBA-b-PMMA).

19. The textured film of claim 15 wherein the TPE composition comprises TPE in the range of 25-100%, one or more polyolefins in the range of 0-25%, and one or more plasticizers in the range of 0-60%.

20. The textured film of claim 1 wherein the TPE composition further comprises one or more additives selected from the group consisting of polyolefins, plasticizers, other elastomers, fluorescent dyes, and antioxidants.

21. The textured film of claim 20 wherein the polyolefins are selected from the group consisting of polypropylene, polyethylene, and copolymers thereof.

22. The textured film of claim 1 wherein the film is further comprised of one or more additives configured to provide electrostatic discharge protection to the film.

23. The textured film of claim 22 wherein the one or more additives are comprised of any one or more of: carbon nano tubes (CNT); carbon black, carbon fibers, conductive polymers, conductive powders, conductive fibers, antistatic additives, or modified urethane.

24. The textured film of claim 1 wherein the film is further comprised of one or more additives configured to exhibit chemical resistance protection to the film.

25. The textured film of claim 24 wherein the one or more additives are comprised of any one or more of: Fluor elastomers or polyphenylene oxide.

* * * * *